(12) United States Patent
Seaberg

(10) Patent No.: US 8,103,518 B2
(45) Date of Patent: Jan. 24, 2012

(54) SYSTEMS AND METHODS FOR NEW ADDRESS VALIDATION

(75) Inventor: Eric I. Seaberg, Germantown, TN (US)

(73) Assignee: United States Postal Service, Washington, DC (US)

( * ) Notice: Subject to any disclaimer, the term of this patent is extended or adjusted under 35 U.S.C. 154(b) by 641 days.

(21) Appl. No.: 11/652,568

(22) Filed: Jan. 12, 2007

(65) Prior Publication Data

US 2008/0172241 A1  Jul. 17, 2008

(51) Int. Cl.
*G06Q 10/00* (2006.01)
*G06F 17/00* (2006.01)
(52) U.S. Cl. .......................... 705/1.1; 705/401; 705/410
(58) Field of Classification Search .................. 705/1.1, 705/401, 410
See application file for complete search history.

(56) References Cited

U.S. PATENT DOCUMENTS

| | | | |
|---|---|---|---|
| 6,549,892 B1 | 4/2003 | Sansone | |
| 6,728,597 B2 | 4/2004 | Didriksen et al. | |
| 2002/0153409 A1 | 10/2002 | Yu | |
| 2003/0182018 A1* | 9/2003 | Snapp | 700/225 |
| 2003/0191651 A1* | 10/2003 | Hungerpiller et al. | 705/1 |
| 2004/0225543 A1* | 11/2004 | Kapochunas et al. | 705/7 |
| 2005/0137991 A1* | 6/2005 | Bruce et al. | 705/410 |
| 2006/0058914 A1* | 3/2006 | Dearing | 700/219 |
| 2006/0155714 A1* | 7/2006 | Lego et al. | 707/100 |

FOREIGN PATENT DOCUMENTS

| | | |
|---|---|---|
| WO | WO 03/077075 | 9/2003 |
| WO | WO2008/088350 A1 | 7/2008 |

OTHER PUBLICATIONS

Hickey, Kathleen, "UPS Debuts Online Tools", Apr. 12, 1999, Journal of Commerce, pp. 36.*
International Search Report and Written Opinion mailed Apr. 17, 2008, in counterpart International Application No. PCT/US2007/001849 (6 pages).
Extended European Search Report mailed Feb. 22, 2011, in counterpart European Application No. 07716964 (6 pages).

* cited by examiner

*Primary Examiner* — Fadey Jabr
(74) *Attorney, Agent, or Firm* — Finnegan, Henderson, Farabow, Garrett & Dunner, LLP

(57) ABSTRACT

Systems and methods are provided for validating an address associated with a delivery item. In one embodiment, a computer-implemented method validates addresses associated with a delivery item. The method includes the steps of electronically receiving a data file from a sender, the data file comprising one or more addresses, and determining whether the addresses can be validated with a first weekly file comprising extended delivery codes and a second weekly file comprising delivery point verifications. The method may further include the steps of processing the data file using a database of addresses that are represented in neither the first weekly file nor the second weekly file, based on the determining step, updating the data file to indicate a status the addresses, and sending the updated data file back to the sender.

14 Claims, 3 Drawing Sheets

SYSTEMS AND METHODS FOR NEW ADDRESS VALIDATION

BACKGROUND

1. Technical Field

The present invention relates to methods and systems in the field of validating addresses associated with delivery items. More particularly, the present invention relates to methods and systems for validating new addresses that have been added after monthly products containing all current addresses have been released to mailers.

2. Background Information

The UNITED STATES POSTAL SERVICE (USPS), an independent establishment of the United States government, is a delivery service provider that handles billions of delivery items on a weekly basis. The USPS delivers items to recipients based upon an address. The address may contain identifying information such as a name, a street, a city, a state, and a postal code, such as a five-digit ZIP Code®), representing a geographic area. The postal code may represent a smaller geographic area (or segment), such as the area represented by a nine-digit ZIP+4® code. For example, a nine-digit ZIP+4 Code may identify a geographic segment having a plurality of delivery points, such as residential block, a firm, or a floor of a high rise building. A delivery point can be defined as the mailing address of a Postal Patron where delivery personnel deliver mail, and may include a residential mailbox located on a curb, a door slot, a box on a house, a centralized group of mail boxes, or the location of a receptionist or mailroom.

The ZIP+4 Code consists of the well-known five-digit ZIP Code, plus an additional four-digit code. The additional digits of the ZIP+4 Code allow more efficient sorting and delivery of items through the delivery process. When four or more business entities have a common primary address, such as an office building, and the addresses are differentiated by secondary address information, such as suite numbers, the building is assigned one or more distinct ZIP+4 Codes. In a similar fashion, when mail is delivered into multiple clusters of mailboxes, a ZIP+4 Code is assigned to each cluster. Yet in a further similar fashion, when mail is delivered to multiple floors within a high-rise building, each floor may be assigned a unique ZIP+4 Code.

Delivery service providers such as the USPS charge shipping fees, such as postage, to senders in order to cover the cost for handling and shipping the delivery item. Under certain circumstances, a delivery service provider may discount the postage for senders that reduce the provider's handling and shipping costs for large quantities of mail.

There are several methods available that allow senders, such as mailers, to better prepare the a delivery item, such as mail, in order to receive a discount on the postage, that is, the shipping fee. One such method is to deliver mail, pre-coded with a bar code, to a USPS mail processing facility. To improve the efficiency of mail delivery before mail is delivered, the USPS, through the use of automated mail processing equipment, applies an eleven-digit delivery point bar code to each mail piece to identify each address. Delivery point bar codes are bar codes of eleven digits, where five digits are allocated to the ZIP Code, 4 digits are allocated to the ZIP+4 Code, and the last two digits are allocated to a unique delivery point. Thus, the ZIP Code may specify a specific area of a town, a ZIP+4 Code may represent a particular block on a street, and a delivery point code may represent a specific house on the block. The USPS then uses that bar code to sort the mail in a delivery sequence order. A postal carrier needs little or no time to prepare the sorted mail for delivery since it has already been sorted in the delivery sequence order.

In order to bar-code mail themselves, mailers can use address validation software to "validate" an address and bar-code each piece of mail. As used herein, the term "validating" an address consists of confirming that an address is deliverable by USPS. If the mailer sends a piece of mail to that address, the item will get delivered and not returned or destroyed, dependent upon addressee name and any endorsements or special services the mailer may apply request. Address validation software may use one or more validation products issued each month by the USPS in order to confirm the existence of newly created addresses in the USPS master addressing database, the Address Management System (AMS).

The USPS adds new delivery addresses on a daily basis totaling approximately two million new delivery addresses each year. However, the validation products, are issued only on a monthly basis. Therefore, a new address can be added to the AMS database in the middle of the month, and thus not be included in the current monthly validation product. The mailer would have to wait until the next monthly validation product is mailed before being able to validate a new address. This time lag can delay validation of a new address for several weeks. The inability to validate an address can cause mail to be inappropriately bar-coded and standardized, thus incurring additional handling by the USPS and reducing the value of that address to the mailer. It can also prevent delivery customers from receiving services because their address cannot be confirmed by a mailer or other business entity.

Therefore, there is a need for systems and methods that solve the problem of the time lag between the creation of a new address in the USPS master addressing database and the ability of the mailing community to validate the new address using USPS validation products.

SUMMARY

Consistent with an embodiment of the present invention, a computer-implemented method is provided for validating an address associated with a delivery item. The method may comprise electronically receiving a data file from a sender, the data file comprising one or more addresses, determining whether the addresses can be validated with a first weekly file comprising extended delivery codes and a second weekly file comprising delivery point verifications, and processing the data file using a database of addresses that are represented in neither the first weekly file nor the second weekly file, based on the determining step. The method may further comprise updating the data file to indicate a status of the addresses, and sending the updated data file to the sender.

Consistent with another embodiment of the present invention, a system is provided for validating an address associated with a delivery item. The system may comprise a server adapted to receive a data file from a sender, the data file comprising one or more addresses. The system may also comprise processing equipment adapted to determine whether the addresses can be validated with a first weekly file comprising extended delivery codes and a second weekly file comprising delivery point verifications. The processing equipment may be further adapted to process the data file using a database of addresses that are represented in neither the first weekly file nor the second weekly file, based on the determining step, update the data file to indicate a status of the addresses, and send the updated data file to the sender.

Consistent with yet another embodiment of the present invention, a computer-readable medium is provided that stores program instructions for validating addresses associated with a delivery item according to the above-described method.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings.

DESCRIPTION OF THE EMBODIMENTS

Figure 1:
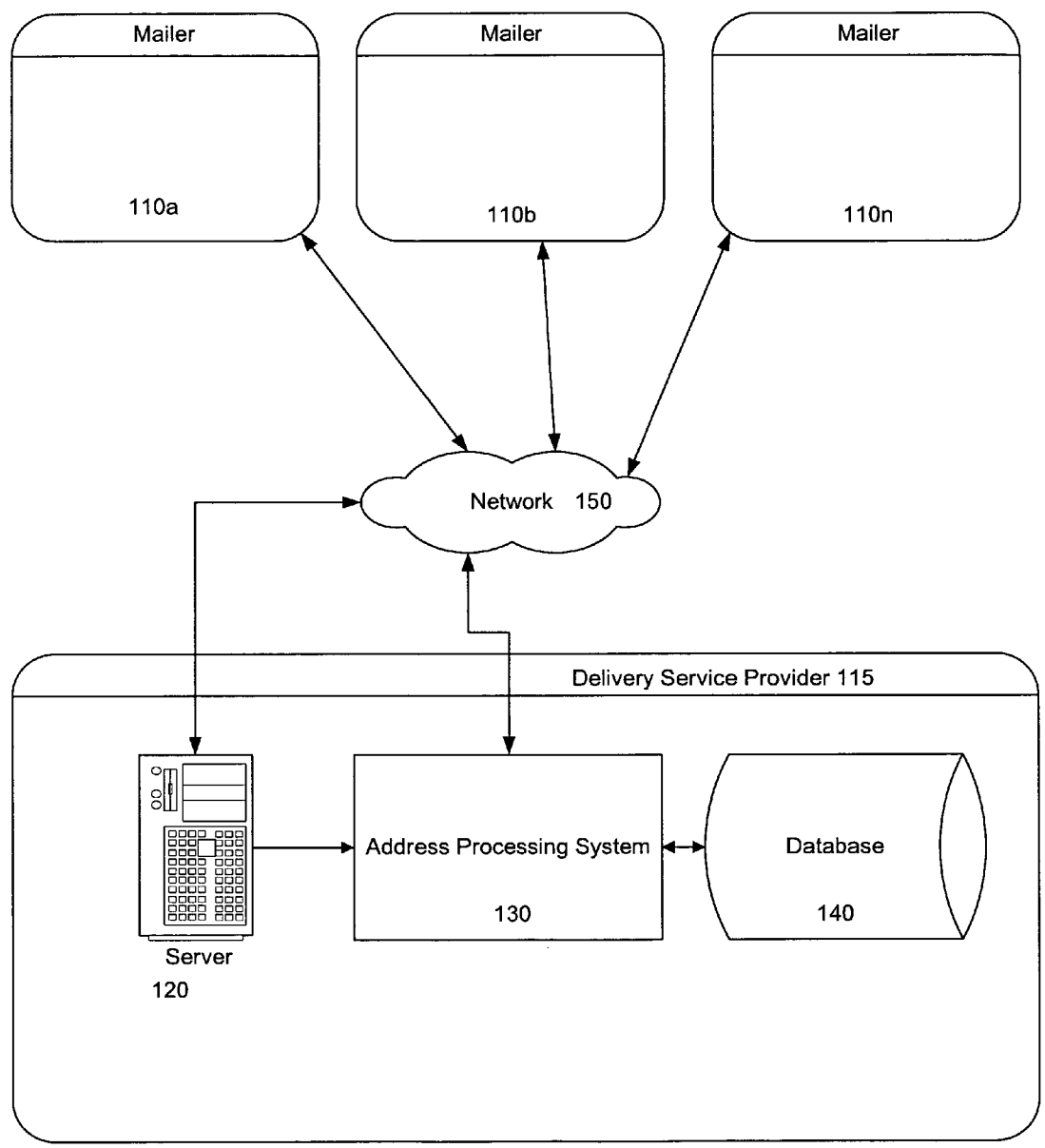
FIG. 1 is a block diagram of an exemplary system environment for validating new addresses, consistent with the present invention.

In order to decrease the volume of inappropriately bar-coded and standardized mail, which incurs additional handling by the USPS and reduces the value of an address to the mailer, systems and methods consistent with the present invention are directed to the problem of the time lag between the creation of a new address in the USPS master addressing database, and enhance the ability of the mailing community to validate the new address using USPS addressing products. Although the present invention is discussed with respect to mail to be delivered by the USPS, it is to be understood that the invention may be employed with respect to other types of delivery items to be delivered by other types of delivery service providers.

Systems and methods consistent with the present invention maintain a database of addresses added to the USPS master addressing database, AMS, within the past sixty days as a source to validate addresses, which are created between product cycles, against the freshest possible data. The USPS maintains the AMS database to store address information which includes records for all addresses and their corresponding extended delivery codes in the format of ZIP+4 Codes.

Systems and methods consistent with the present invention provide a way for the mailing community to validate the existence of newly created addresses in the USPS master addressing database, AMS, prior to the availability of these addresses in the normal monthly validation products such as ZIP+4™, DPV™, and DSF²™. The ZIP+4™ product enables mailers to add ZIP+4 codes to each address in their address files. The ZIP+4™ product contains approximately 30 million records.

The DPV™ product helps mailers validate the accuracy of their address information, including the physical delivery point. Mailers are able to identify individual addresses within a mailing list that are potentially undeliverable-as-addressed due to an addressing deficiency. The DPV™ product is a secure dataset of the 145+ million USPS-delivered addresses. The DPV™ product is limited to identifying whether an address is considered to be a deliverable address and whether an address is identified as a Commercial Mail Receiving Agency.

The DSF²™ product contains the same data found in the DPV™ product along with additional address-attribute data. Address-attribute data are additional intelligence flags not directly related to the address format or content. Instead, the address-attribute data tells the mailer something more about an address. An example of address-attribute data would be, "Is this address vacant?" or, "Is this address a residential or business delivery address?" or, "Is this address delivered by a curb-side mailbox or by a door-slot?" Address-attribute data allows mailers to produce more targeted mailings. An example might be a mailer who wants to send out a sample box of laundry soap—this mailer may want to deliver mail only to residential addresses that have a rural-style curb mailbox since the soapbox would not fit through a standard door slot or into a conventional wall-mounted mailbox.

Systems and methods consistent with the present invention use the USPS internal DPFNow process to identify newly-created addresses. DPFNow is a process that captures address changes, deletions, and additions as they are entered in AMS and applies those changes to a related database, known as the DPF (Delivery Point File), as will be described further below.

Systems and methods consistent with the present invention will accept electronic transactions from mailers via the Internet, the transactions containing a data file comprising addresses that the mailers cannot validate using address validation software and the USPS products ZIP+4 and DPV™, and will compare the submitted addresses against the a separate database containing data captured by DPFNow.

Reference will now be made in detail to present embodiments consistent with the invention, examples of which are illustrated in the accompanying drawings. Wherever possible, the same reference numbers will be used throughout the drawings to refer to the same or like parts.

FIG. 1 is a block diagram of an exemplary system 10, consistent with the present invention. Components of system 10 may be adapted to validate addresses received from one or more mailers. As shown in FIG. 1, system 10 includes one or more mailers 110a-n. Although a mailer is referred to below as submitting addresses, a service provider who is running address lists belonging to others may also submit addresses.

System 10 may also include a server 120, a Delivery Service Provider (DSP) 115, an Address Processing System (APS) 130, and a database 140 (described further below), which are all connected to a network 150. It is noted that various combinations of the components in DSP 115 may be owned and operated by any mail delivery service provider (e.g., USPS). One of ordinary skill in the art will recognize that functions provided by one or more components of system 10 may be combined. Further, as will be appreciated by those skilled in the art, the number and orientation of the components illustrated in FIG. 1 are merely examples and do not limit the scope of the invention. Therefore, other arrangements and sets of components are feasible, consistent with the principles of the invention. Moreover, several of the components (such as mailers 110a-n) may be third parties sending a data file representing one or more addresses for the purpose of validating the address associated with one or more delivery items that the mailers may not be able to validate using their own address validation software.

As described above, mailers 110a-n may serve as source systems for providing unvalidated addresses to be validated. An unvalidated address is an address that cannot be matched to an existing ZIP+4 Code record or delivery point address using the most current monthly ZIP+4 and DPV product files. Examples of mailers 110a-n that send the unvalidated addresses may include individuals, companies, organizations, or any entities that provide mail to the mail delivery institution for processing and delivery.

In operation, mailers 110a-n may have one or more addresses to validate in order to bar-code the mail themselves. Mailers 110a-n may first use address validation software in order to validate one or more addresses. Address validation software may include address correction, address verification, and standardization software products that enable mailers to cleanse, verify, and standardize their addresses. Address validation software assigns appropriate city names and ZIP+4 Codes to ensure proper delivery. Address validation software, however, relies on monthly ZIP+4™ and DPV™ product files in order to be able to validate addresses.

If a mailer is attempting to validate a new address added after the mailer received the latest ZIP+4™ and DPV™ product file, the mailer will not be able to validate this address because the address will not be contained in the monthly ZIP+4™ and DPV™ products. The mailer may then send a data file of unvalidated addresses to server 120. Each data file may contain one or more addresses that are not yet validated. Each address in the file may also include a "status" indicator, wherein the status of each address may be set to "valid" or "invalid" depending on whether the address in the file is valid or invalid. The status of each address may be updated by APS 130, as will be described further below. In one embodiment, the data file may be an Extensible Markup Language (XML) data file.

Server 120 may comprise a general purpose computer (e.g., a personal computer, network computer, server, or mainframe computer) having a processor (not shown) that may be selectively activated or reconfigured by a computer program (not shown). Server 120 may also be implemented in a distributed network. Alternatively, server 120 may be specially constructed for carrying out methods consistent with a particular embodiment. Accordingly, server 120 may include software-based logic (not shown) for receiving the data file from mailers 110a-n and may also send a message to each mailer 110a-n that their respective the data file back is ready for pick up once the file has been updated by APS 130, as will be described below. Server 120 may include a database for storing the received data file after the data file is received by mailers 110a-n and after it is updated by APS 130. Server 120 may also be implemented as a Web server (as represented in FIG. 1) or any number of distributed servers (not shown).

The components shown in FIG. 1, including server 120, may comprise computing devices or platforms. By way of example, each of such computing devices may include a central processing unit (CPU), a disk drive, a memory, and a network access device.

APS 130 may receive the data file from server 120 and may attempt to validate each address in the file using database 140, as will be described further below. In one embodiment, APS 130 may be the New Address Validation System (NAVS) provided by the USPS.

Database 140 may comprise any medium for storing information, such as a magnetic or optical storage medium. In one embodiment, database 140 stores information that can be accessed through a conventional database protocol, such as Structured Query Language (SQL). Examples of database 140 include, but are not limited to, an Oracle relational database management system, a Microsoft SQL Server, and a Sybase SQL Server.

The CPU of a computing device may be any appropriate processor or set of processors for executing program instructions. Memory may be Random Access Memory (RAM) or any other permanent, semi permanent, or temporary storage device, including Read-Only Memory (ROM) and flash memory. Disk drives may comprise a hard disk drive, an optical drive, or any other type of data storage device.

The network access device of a computing device may be a modem, a cable modem, an Ethernet card, a T1 line connector, or any other access device for connecting a respective system component (e.g., server 120, APS 130) to another system component or connecting a respective system component directly to network 150.

Network 150 provides communications between the various entities in system 10, such as server 120, mailers 110a-n, and DSP 115. Network 150 may be a shared, public, or private network; may encompass a wide area or local area; and may be implemented through any suitable combination of wired and/or wireless communication networks. Furthermore, network 150 may comprise a local area network (LAN), a wide area network (WAN), an Intranet, or the Internet. Conventional protocols and encryption methods may be used for electronically transmitting data over network 150. For example, HyperText Transfer Protocol (HTTP) and File Transfer Protocol (FTP) may be used for data transfers, and encryption may be achieved through secure file transfer protocol or secure copy.

Although not shown, each of the computing devices in FIG. 1 may be connected to one or more input devices, such as a keyboard, a mouse, or some other type of means for inputting data to the computing device. Further, each of the computing devices may be connected to one or more display devices, such as a monitor or any other visual and/or audio-visual output device.

Figure 2:
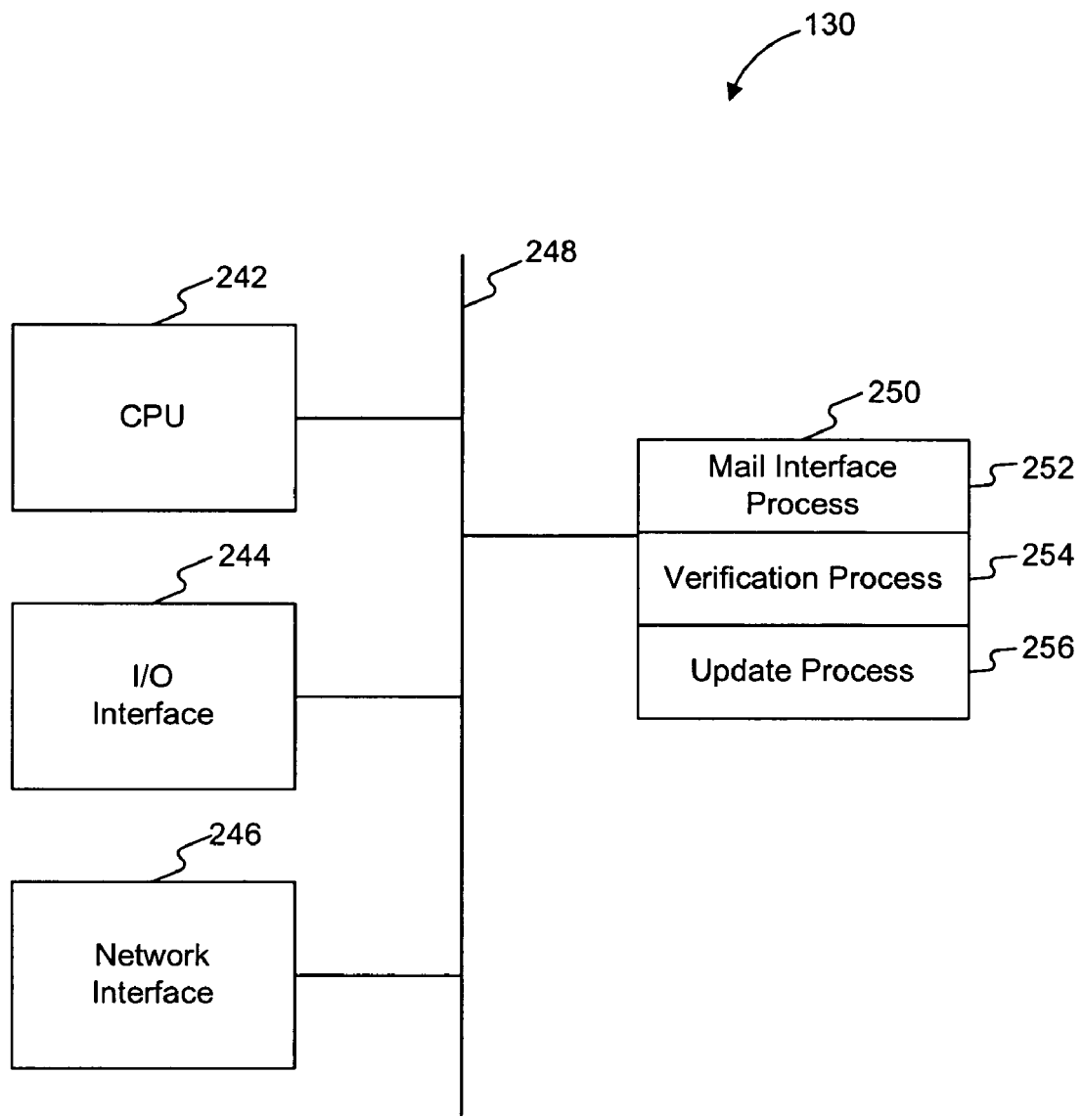
FIG. 2 is a block diagram of an exemplary planning system, consistent with an embodiment of the present invention.

FIG. 2 is a block diagram of an exemplary APS 130, consistent with an embodiment of the present invention. APS 130 may include at least one central processing unit (CPU) 242, an I/O interface 244, a network interface 246, and a memory 250. CPU 242 may execute instructions associated with the processes contained in a memory 250 and transmit results to other subsystems of APS 130 over a high-speed interconnect or data bus 248. I/O interface 244 is an interface that may be used to couple APS 130 to devices such as a keyboard, a mouse, a display device, and any other I/O device useful in operating an APS 130 as is understood by one of skill in the art. The network interface 246 may be used to communicate with network 150 (cf. FIG. 1).

In one embodiment, memory 250 may include mailer interface process 252, which may have program instructions that, when executed, receives the data file from server 120 (FIG. 1). Memory 250 may also store a validation process 254, which may comprise program instructions that, when executed, can validate one or more addresses in the data file. Memory 250 may also store an update process 256, which may comprise program instructions that, when executed, can update the data file received from the server 120 to reflect whether each address in the data file is "valid" or "invalid," and can also send the data file back to the server 120.

Figure 3:
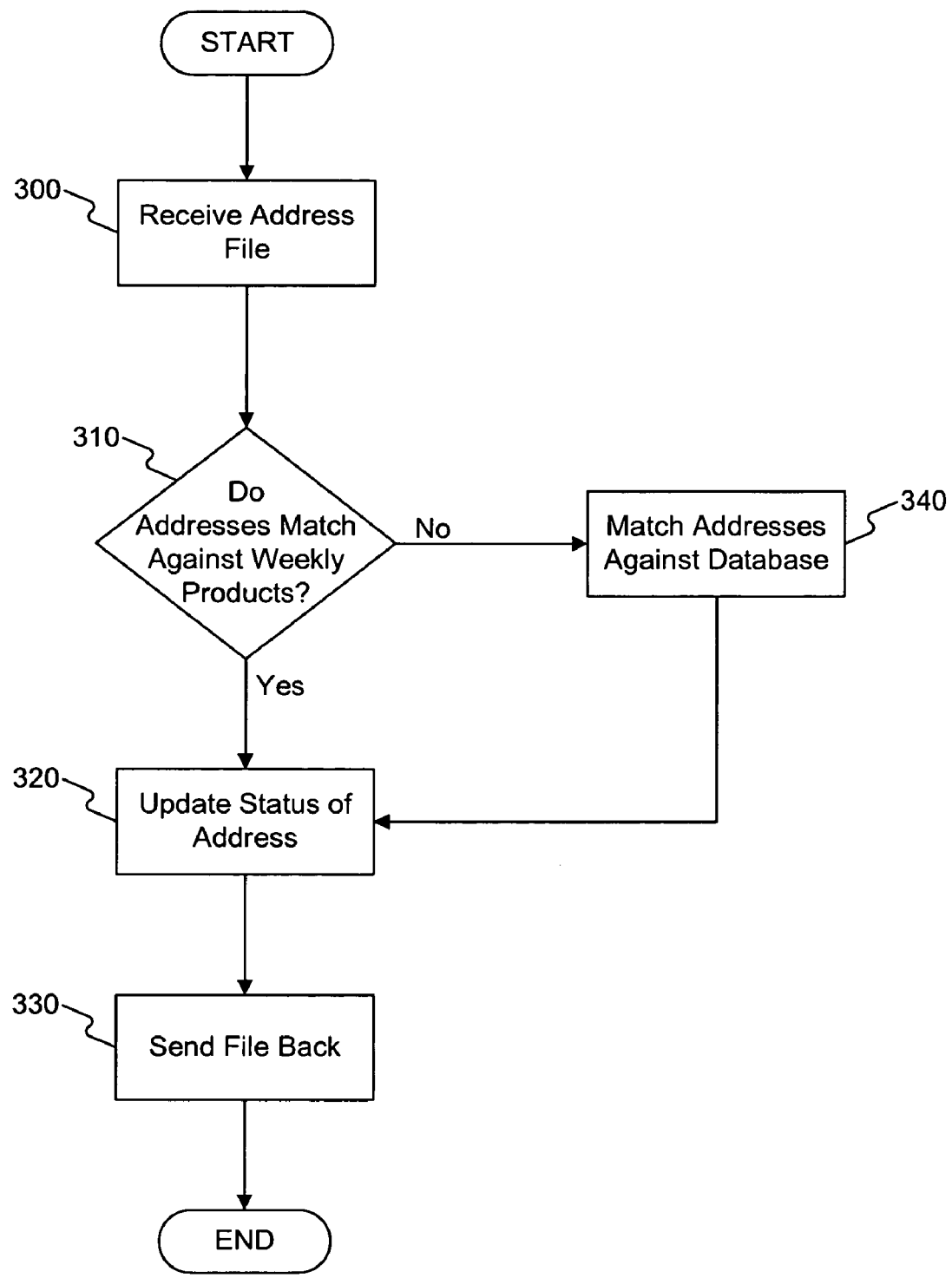
FIG. 3 is a flow diagram of an exemplary process for validating new addresses, consistent with the present invention.

FIG. 3 is a flow diagram of an exemplary process for validating new addresses received from one or more mailers, consistent with the present invention. The flow diagram will be described with reference to exemplary system 10 as shown in FIG. 1.

In step 300, server 120 receives, from one or more mailers 110a-n, a data file comprising one or more unvalidated addresses. Each address in the file corresponds to an address that the mailer could not validate with existing address validation software and the current USPS products made available for validating addresses.

The addressing data products provided by USPS are created monthly, on the second complete weekend of the month. For example, the product files dated Aug. 15, 2006, were actually created from the AMS database the weekend of July 8/9, 2006. A new address added to the AMS database on Jul. 7, 2006, the Friday immediately preceding the product build weekend, cannot be validated by mailers until around Jul. 31, 2006, three-plus weeks after it was created. For example, if the address is added on July 10, the Monday after the product build, it currently cannot be validated using the USPS DPV™ product until around the first week of September, eight weeks after it was added. A mailer 110a-n cannot validate the address added on July 10$^{th}$, as well as hundreds of thousands of other addresses added to USPS systems since Jul. 10, 2006 until the next product file is created.

When a mailer using address validation software that runs an address list against DPV™ as well as the other USPS products cannot validate an address, the mailer posts a transaction containing this unvalidated address to a server 120 for validation using a database of newly added addresses since the last product files were created. The mailers 110a-n may send this transaction in the form of an XML data file. Data files can either consist of a single address or a list of unvalidated addresses. Server 120 may first check the validity of the data file received from the mailer. Server 120 may determine, for example, whether the file is a valid XML file. Server 120 may also check to ensure the file was sent by a current subscriber. A current subscriber is a mailer that is associated with the APS 130 system, through a subscription, as described further below. If server 120 determines the data file sent is not valid, server 120 may reject the data file and send it back to the mailer 110a-n that sent the file.

If the server 120 determines the data file is valid, server 120 then sends the data file to APS 130. APS 130 may then attempt to validate the addresses in the data file by matching each address against periodic validation products issued more frequently than the monthly validation product, such as the current weekly ZIP+4™ and DPV™ products. (Step 310). The current weekly products contain new addresses added to AMS but not yet in the monthly products. The weekly products are not released to mailers and are used only within USPS. The weekly products are updated once a week based on any changes in AMS. The AMS system provides the source data for the DPV™ and ZIP+4 products.

APS 130 may process the addresses in the data file by first comparing each in the data file against the weekly ZIP+4 product. The ZIP+4 product accepts addresses with street, city, and state information and attempts to match them against addresses in the AMS database, or a subset of a master address database, such as the DPF.

If APS 130 finds a match between an address in the data file and an address in the current ZIP+4™ and DPV™ weekly products, then the address is considered valid. The data file is updated with the current status of the address (step 320). An updated data file may consist of each address line status indicator being changed from "invalid" to "valid." The next address is then processed. If no more addresses exist in the data file, APS 130 sends the data file back to server 120. Server 120 then notifies the mailers 110a-n that originally sent the data file that the data file has been updated and is ready for pick up (step 330). When processing is complete, the mailers 110a-n will receive notification that their data is available. The mailer can then access the server 120 and retrieve the data file. In one embodiment, the file may be associated with a status code, therefore, once the status code is "completed," the mailer may then retrieve the file from server 120. In another embodiment, server 120 may send the mailer associated with the data file a message indicating the process is complete and the data file is ready for pick up.

If a match is not found in step 310, then APS 130 will attempt to match the addresses in the data file against the database 140 (step 340). Database 140 may consist of addresses added to the USPS master addressing database, AMS, within the past sixty days. Database 140 may be updated using a process that captures changes entered into the AMS database as they are made, and then applies the changes to the DPF. The same changes made to AMS are captured in database 140.

In one embodiment, the process of capturing changes entered into the AMS database is performed using DPFNow. DPFNow is a proprietary USPS process that captures changes entered into the AMS database as they are made, then applies them to a separate master DPF. The DPF is the "master address list". The AMS database may store all the address information, but it is all normalized so that any given record in AMS only contains part of the information associated with a particular address. The DPF is the output from AMS where all of the information associated with an address is contained in a single record. Database 140 is a subset of the data in DPF. Database 140 consists of addresses added within the past 60 days. It is a subset of the data to ensure good performance response times, and also because after 60 days the address may have appeared in 2 product cycles. In one embodiment, database 140 may be the NAVS database, provided by the USPS.

Once a match is found between an address in the data file and database 140, the address in the data file is again updated indicating the address is valid (step 320). If there are no more addresses in the data file, the data file is then sent back to server 120 (step 330), and the mailer that sent the file can pick up the file from the server 120, as described above. If more than one address exists in the data file, APS 130 performs the same steps described above with regard to each address in the data file.

In one embodiment, one or more addresses may not be validated using database 140. This may be the case where an address exists in the data file that is not in database 140. In this case, a footnote code may be inserted into the data file containing the unvalidated address indicating an address could not be found in database 140 and, therefore, the address could not be validated. APS 130 may not be able to validate an address if the version of the addresses presented by the mailer is so distorted that it cannot be matched to the correct address using one or more techniques such as a text string search in the database 140.

APS 130 may allow new addresses to be validated the day after they are entered into AMS, not weeks afterwards. Additionally, the APS process enables this validation while preserving the security and privacy of the USPS intranet, products, and addressing database. The mailer software never accesses the USPS data directly, but posts transactions that are processed by USPS programs. Privacy and Title 39 considerations are protected as well, because APS 130 will only provide an answer if the mailer software provides the address.

The technology used in APS 130 may also be applied to other address-based validation processes. Other potential services include address status validation (vacancy, deletion, etc.) and enabling any and all addresses to be validated using this technology for specific markets and mailers.

In one embodiment, each mailer is charged a fee with regard to each transaction performed by APS 130. Therefore, for each address validated, the mailer is charged a set fee. In another embodiment, a mailer may sign up for a monthly service, where each month, the mailer can request APS 130 to validate as many addresses as they want, without incurring a cost for each address validation. In yet another embodiment, a mailer can sign up for different subscription levels. For each level, a set number of transactions is allowed. A subscription level with more transactions may cost more than a subscription level with fewer transactions.

Although the present invention was discussed above with respect to mail being delivered by the USPS, it is to be understood that the invention may be employed with respect to other types of delivery items to be delivered by other types of delivery service providers.

Furthermore, the foregoing descriptions of the invention have been presented for purposes of illustration and description. They are not exhaustive and do not limit the invention to the precise form disclosed. Modifications and variations are possible in light of the above teachings or may be acquired from practicing the invention. For example, the described implementation includes software, but the present invention may be implemented as a combination of hardware and software, or in hardware alone. Additionally, although aspects of the present invention are described as being stored in memory, one skilled in the art will appreciate that these aspects can also be stored on other types of computer-readable media, such as secondary storage devices like hard disks, floppy disks, or CD-ROMs; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for validating an address associated with a delivery item, the method comprising:
    electronically receiving a data file from a sender, the data file comprising one or more addresses that the sender failed to validate with address validation software, wherein a status of the one or more addresses is invalid and the status is indicated in the data file when the data file is received;
    determining, by a processor, whether the one or more addresses can be validated with a first weekly file comprising extended delivery codes and a second weekly file comprising delivery point verifications;
    processing, by a processor, the data file using a database of addresses that are represented in neither the first weekly file nor the second weekly file, based on the determining step, including matching the one or more addresses with the addresses in the database;
    updating the status indicated in the data file, after the processing, to indicate that the status of the one or more addresses previously indicated as invalid is valid; and
    sending the updated data file to the sender.

2. The method of claim 1, wherein the extended delivery code is a ZIP+4 code.

3. The method of claim 1, wherein the first weekly file is a weekly ZIP+4 product.

4. The method of claim 1, wherein the database comprises new addresses created subsequent to the creation of the first weekly file and the second weekly file.

5. The method of claim 1, further comprising:
    determining whether the format of the file is valid; and
    sending the file to the sender before validating the addresses in the file when the file format is determined to be invalid.

6. A system for validating an address associated with a delivery item, the system comprising:
    a server adapted to receive a data file from a sender, the data file comprising one or more addresses that the sender failed to validate with address validation software, wherein a status of the one or more addresses is invalid and the status is indicated in the data file when the data file is received; and
    processing equipment adapted to determine whether the one or more addresses can be validated with a first weekly file comprising extended delivery codes and a second weekly file comprising delivery point verifications;
    wherein the processing equipment is further adapted to:
    process the data file using a database of addresses that are represented in neither the first weekly file nor the second weekly file, based on the determining step, including matching the one or more addresses with the addresses in the database;
        update the status indicated in the data file, after the processing, to indicate that the status of the one or more addresses previously indicated as invalid is valid; and
    send the updated data file to the sender.

7. The system of claim 6, wherein the extended delivery code is a ZIP+4 code.

8. The system of claim 6, wherein the first weekly file is a weekly ZIP+4 product.

9. The system of claim 6, wherein the database comprises new addresses created subsequent to the creation of the first weekly file and the second weekly file.

10. The system of claim 6, wherein the server is further adapted to:
    determine whether the format of the file is valid; and
    send the file to the sender before validating the addresses in the file when it is determined that the file format is invalid.

11. A non-transitory computer-readable storage medium storing computer-executable instructions for validating an address associated with a delivery item to perform a method, the method comprising:
    electronically receiving a data file from a sender, the data file comprising one or more addresses that the sender failed to validate with address validation software, wherein a status of the one or more addresses is invalid and the status is indicated in the data file when the data file is received;
    determining whether the one or more addresses can be validated with a first weekly file comprising extended delivery codes and a second weekly file comprising delivery point verifications;
    processing the data file using a database of addresses that are represented in neither the first weekly file nor the second weekly file, based on the determining step, including matching the one or more addresses with the addresses in the database;
    updating the status indicated in the data file, after the processing, to indicate that the status of the one or more addresses previously indicated as invalid is valid; and
    sending the updated data file to the sender.

12. The non-transitory computer-readable storage medium of claim 11, wherein the extended delivery code is a ZIP+4 code.

13. The non-transitory computer-readable storage medium of claim 11, wherein the first weekly file is a weekly ZIP+4 product.

14. The non-transitory computer-readable storage medium of claim 11, wherein the database comprises new addresses created subsequent to the creation of the first weekly file and the second weekly file.

* * * * *